US011962406B2

(12) United States Patent
Chen et al.

(10) Patent No.: US 11,962,406 B2
(45) Date of Patent: Apr. 16, 2024

(54) SPECTRAL MASKS FOR SUBCHANNEL PUNCTURING IN EHT NETWORKS

(71) Applicant: Intel Corporation, Santa Clara, CA (US)

(72) Inventors: Xiaogang Chen, Portland, OR (US); Qinghua Li, San Ramon, CA (US); Thomas J. Kenney, Portland, OR (US); Assaf Gurevitz, Ramat Hasharon (IL); Avishay Friedman, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 17/124,792

(22) Filed: Dec. 17, 2020

(65) Prior Publication Data

US 2022/0029735 A1    Jan. 27, 2022

Related U.S. Application Data

(60) Provisional application No. 63/054,920, filed on Jul. 22, 2020.

(51) Int. Cl.
*H04L 1/00* (2006.01)
*H04W 80/02* (2009.01)
*H04W 84/12* (2009.01)

(52) U.S. Cl.
CPC .......... *H04L 1/0013* (2013.01); *H04W 80/02* (2013.01); *H04W 84/12* (2013.01)

(58) Field of Classification Search
CPC ..... H04L 1/0013; H04L 5/0066; H04L 5/001; H04L 27/2605; H04L 25/03834; H04L 5/0048; H04L 27/26025; H04L 5/0007; H04L 5/0037; H04L 5/003; H04L 27/26; H04L 5/0053; H04L 5/0044; H04L 5/0094; H04W 84/12; H04W 80/02; H04W 52/367; H04W 52/262; H04W 72/0453; H04W 52/281; H04W 52/16; H04W 52/225; H04W 74/0816; H04W 72/04; H04B 1/7156; H04B 2001/71563
See application file for complete search history.

(56) References Cited

U.S. PATENT DOCUMENTS

| 10,728,861 | B2 * | 7/2020 | Chen ................. H04W 72/0453 |
| 10,827,385 | B2 * | 11/2020 | Verma .................. H04L 5/0053 |
| 11,109,278 | B2 * | 8/2021 | Verma ............... H04W 72/0446 |
| 11,224,046 | B2 * | 1/2022 | Atefi ..................... H04W 76/10 |

(Continued)

*Primary Examiner* — Jung Liu
(74) *Attorney, Agent, or Firm* — Schwegman Lundberg & Woessner, P.A.

(57) ABSTRACT

An extremely high-throughput (EHT) station (STA) may encode an EHT PPDU for transmission on a plurality of subchannels. The EHT STA may determine a spectral mask to apply to the EHT PPDU prior to transmission of the EHT PPDU. When preamble puncturing is performed, the EHT STA may apply an overall spectral mask to the EHT PPDU prior to transmission. The overall spectral mask may be based on an interim spectral mask and a preamble-puncture spectral mask. The subchannels may be in a 6 GHz band and the EHT STA may determine if preamble puncturing is to be performed for one or more of the subchannels based on a presence of incumbents in the one or more of the subchannels, although the scope of the embodiments is not limited in this respect.

15 Claims, 11 Drawing Sheets

(56) References Cited

U.S. PATENT DOCUMENTS

| | | | |
|---|---|---|---|
| 11,452,098 B2* | 9/2022 | Verma | H04L 5/0094 |
| 11,671,998 B2* | 6/2023 | Atefi | H04W 28/18 |
| | | | 370/329 |
| 2019/0110261 A1* | 4/2019 | Chen | H04L 5/001 |
| 2021/0320831 A1* | 10/2021 | Park | H04L 27/2621 |
| 2021/0345404 A1* | 11/2021 | Lu | H04L 1/0069 |
| 2022/0393843 A1* | 12/2022 | Verma | H04W 72/00 |
| 2023/0040899 A1* | 2/2023 | Seok | H04L 5/0053 |

* cited by examiner

320MHz PPDU with two edge 80MHz punctured
(240MHz with edge 80 punctured)

320MHz PPDU with edge 80MHz + middle 80MHz punctured (if removed in the end the we don't need this)

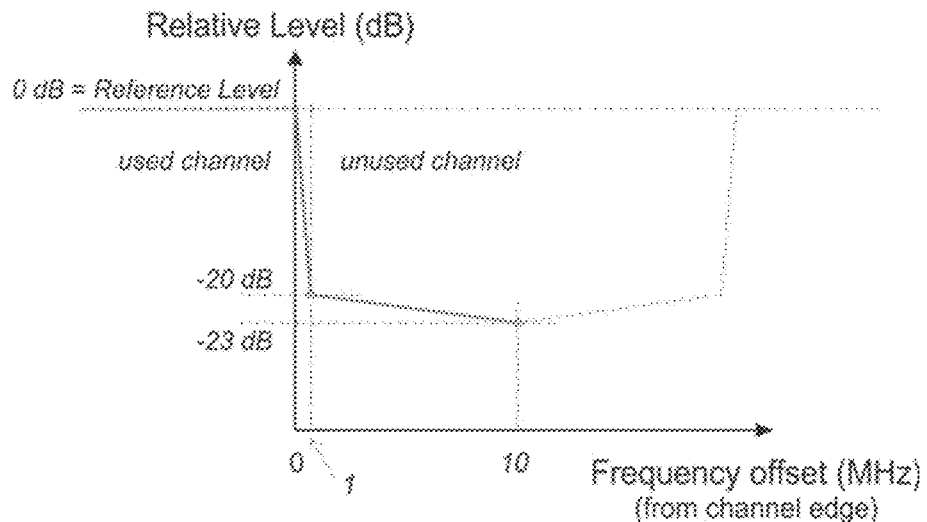
FIG. 17 Middle puncturing rule for puncturing BW = 20Mhz
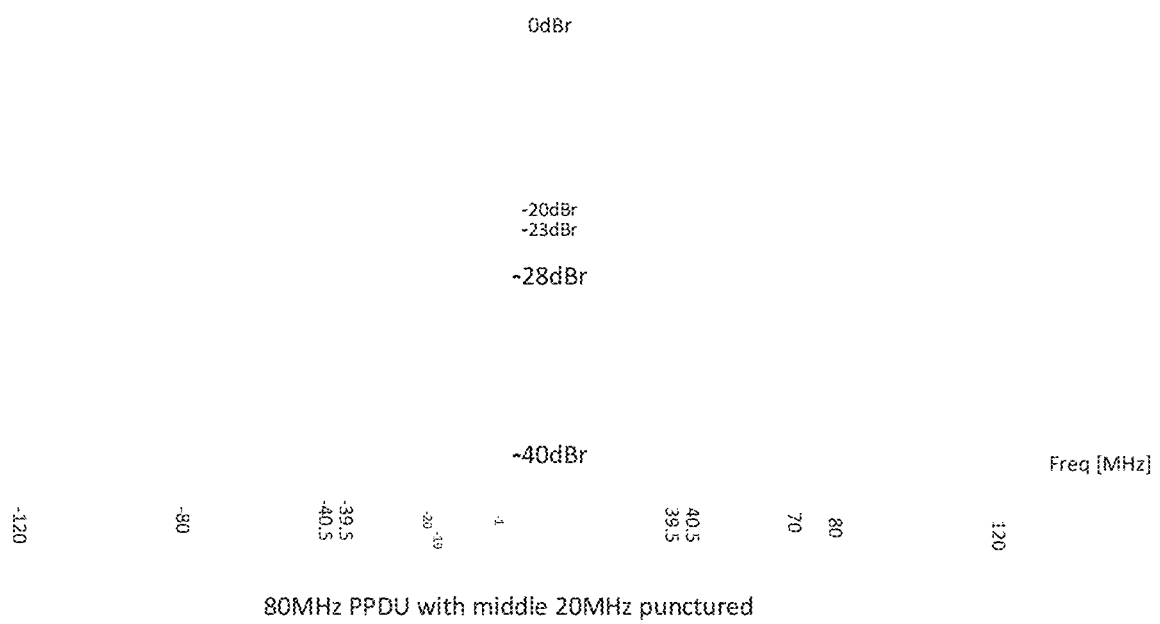
80MHz PPDU with middle 20MHz punctured
FIG. 18

SPECTRAL MASKS FOR SUBCHANNEL PUNCTURING IN EHT NETWORKS

PRIORITY CLAIM

This application claims priority under 35 USC 119(e) to U.S. Provisional Patent Application Ser. No. 63/054,920 filed Jul. 22, 2020 which is incorporated herein by reference in its entirety.

TECHNICAL FIELD

Embodiments pertain to wireless communications. Some embodiments relate to wireless local area networks (WLANs). Some embodiments relate to WLAN communications in accordance with the IEEE 802.11be draft standard (i.e., Extremely High Throughput (EHT)). Some embodiments relate to subchannel puncturing.

BACKGROUND

One issue with EHT communications in accordance with the IEEE 802.11be draft standard is the presence of incumbents. If an incumbent is detected on a subchannel, that subchannel should be punctured when transmitting an EHT PPDU. Additional spectral mask restrictions may therefore be needed to prevent signal leakage from the occupied subchannels to the punctured subchannels.

BRIEF DESCRIPTION OF THE DRAWINGS

FIG. 17 illustrates a middle puncturing rule for bandwidth equaling 20 MHz in accordance with some embodiments;

FIG. 18 illustrates a spectral mask for an 80 MHz PPDU with middle 20 MHz puncturing in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The IEEE 802.11be draft standard defined significantly more punctured modes due to the incumbents in 6 GHz band. All of those modes need a puncturing mask as 11ax. But 11ax puncturing mask is too relaxed and got a lot of comments that ask 11ax to tighten the mask. Embodiments disclosed herein provide comprehensive rules for the 11be puncturing mask definition and provides the examples for the most representative ones. Embodiments disclosed below propose three rules to cover the different puncturing cases defined in 11be for different bandwidths.

Figure 1:
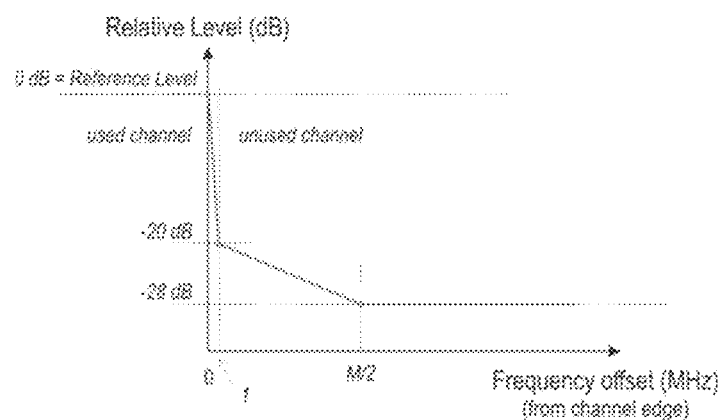
FIG. 1 illustrates a puncturing rule for edge puncturing in accordance with some embodiments.

Edge puncturing rule: When the lowest and/or the highest channel(s) in a PPDU is/are punctured, an additional channel edge mask as in FIG. 1 shall be applied at the lower edge and at the higher edge of the PPDU. M is the separation in MHz between these 2 channel edges. FIGS. 2-11 illustrated spectral masks for various EHT PPDUs with edge puncturing.

Figure 12:
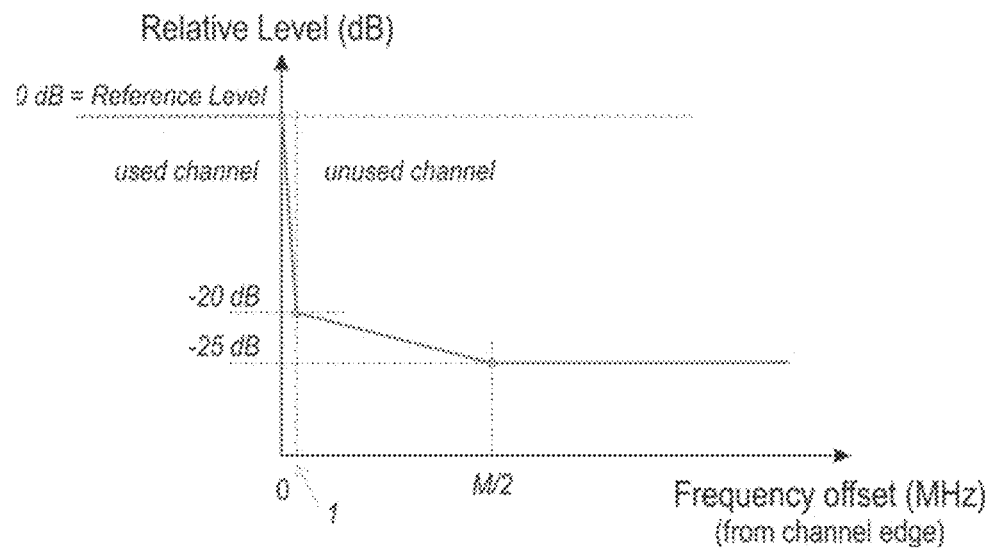
FIG. 12 illustrates a middle puncturing rule for bandwidths greater than or equal to 40 MHz in accordance with some embodiments.

Middle puncturing rule if punctured bandwidth is >=40 MHz: When there are equal to or more than contiguous 40 MHz is punctured in a PPDU, an additional channel edge mask as in FIG. 12 shall be applied only at the lowest and highest edge of the punctured channel. M is the total bandwidth of used channels adjacent to the punctured channel(s). FIGS. 13-16 illustrate spectral masks for various EHT PPDU with middle subchannel >=40 MHz puncturing.

Figure 19:
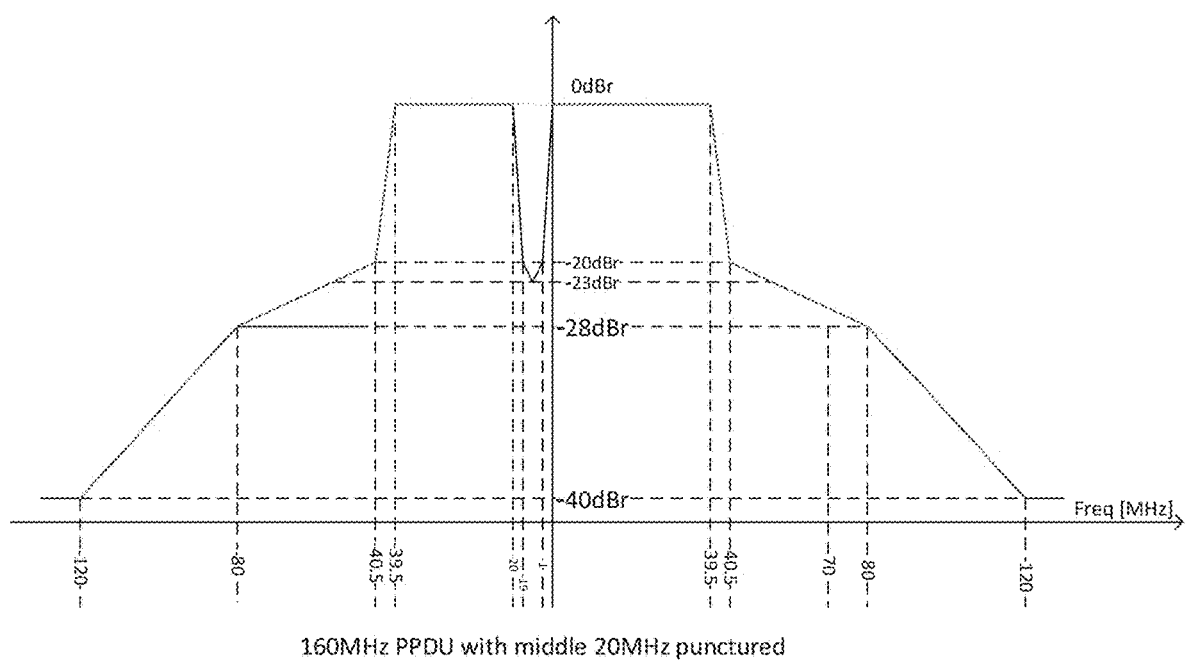
FIG. 19 illustrates a spectral mask for an 160 MHz PPDU with middle 20 MHz puncturing in accordance with some embodiments.

Middle puncturing rule for puncturing BW=20 MHz: When there is only one 20 MHz channel punctured in a PPDU and this punctured 20 MHz channel is not at the edge of the PPDU, an additional mask as in FIG. 17 shall be applied at both edges of the punctured 20 MHz channel. FIGS. 18 and 19 illustrate spectral masks for various EHT PPDU with middle subchannel 20 MHz puncturing.

Some embodiments are directed to an extremely high-throughput (EHT) station (STA). In these embodiments, the EHT STA may encode an EHT physical layer conformance procedure (PLCP) protocol data unit (PPDU) for transmission on a plurality of subchannels. In some embodiments, the EHT PPDU may comprise a preamble portion and a subsequent portion. In these embodiments, the EHT STA may be configured to determine a spectral mask to apply to the EHT PPDU prior to transmission of the EHT PPDU. When preamble puncturing is performed, the EHT STA may apply an overall spectral mask to the EHT PPDU prior to transmission. The overall spectral mask may be based on an interim spectral mask and a preamble-puncture spectral mask.

In some embodiments, when preamble puncturing is performed, the EHT STA may configure the preamble portion and the subsequent portion of the EHT PPDU for transmission on each of the subchannels of the plurality except for one or more punctured subchannels of the plurality. In these embodiments, when preamble puncturing is not performed, the EHT STA may configure the preamble portion and the subsequent portion of the EHT PPDU for transmission on each of the subchannels of the plurality. In these embodiments, when preamble puncturing is performed, nothing is transmitted on the punctured subchannels.

In some embodiments, when preamble puncturing is not performed, the EHT STA may only apply the interim spectral mask to the EHT PPDU. In these embodiments, when preamble puncturing is performed, the EHT STA may apply the interim spectral mask and further apply the preamble-puncture spectral mask to the EHT PPDU, and determine the preamble-puncture spectral mask based on whether the one or more punctured subchannels comprise edge subchannels or comprise middle subchannels of the EHT PPDU.

In some embodiments, the one or more subchannels comprise subchannels in a 6 GHz band. In these embodiments, preamble puncturing is performed on the punctured subchannels based on a presence of incumbents.

In some embodiments, for edge subchannel puncturing when the one or more punctured subchannels comprise an edge subchannel (i.e., when either a highest and/or lowest subchannel of the EHT PPDU is a punctured subchannel), the EHT STA may determine a mask value for the overall spectral mask. In these embodiments, for each frequency where the non-preamble-puncture spectral mask has a value of zero decibels relative to a reference level (dBr) and the preamble-puncture spectral mask does not have a value in an occupied one of the subchannels, the EHT STA may set the mask value for the overall spectral mask to zero dBr. In these embodiments, for other frequencies where the non-preamble-puncture spectral mask and the preamble-puncture spectral mask both have values greater or equal to −40 dBr, the EHT STA may set the mask value for the overall spectral mask to a lower value of the non-preamble-puncture spectral mask and the preamble-puncture spectral mask, and apply the overall spectral mask at an edge of an occupied one of the subchannels, the edge of the occupied subchannel being adjacent to one of the punctured subchannels (i.e., the edge subchannel that is being punctured).

In some embodiments, for middle subchannel puncturing when the two or more adjacent subchannels within a central portion of the EHT PPDU are punctured, the two or more adjacent subchannels may comprise a lowest punctured subchannel and a highest punctured subchannel. In these embodiments, the EHT STA may apply a lower subchannel edge mask at a lower edge at the lowest punctured subchannel and apply a higher subchannel edge mask at a higher edge of the highest punctured subchannel. In these embodiments, the EHT STA may determine mask values for the overall spectral mask. For each frequency where the lower subchannel edge mask and the higher subchannel edge mask have a value greater than −25 dBr and less that −20 dBr, the EHT STA may set the mask value for the overall spectral mask to a larger value of the lower subchannel edge mask and the higher subchannel edge mask. In these embodiments, for each frequency where the non-preamble-puncture spectral mask has a value and the preamble-puncture spectral mask does not have a value in an occupied subchannel, the EHT STA may set the mask value for the overall spectral mask to the value of the non-preamble-puncture spectral mask. In these embodiments, for other frequencies where the non-preamble-puncture spectral mask and the preamble-puncture spectral mask both have values greater or equal to −25 dBr, the EHT STA may set the mask value for the overall spectral mask to a lower value of the non-preamble-puncture spectral mask and the preamble-puncture spectral mask.

In some embodiments, for middle subchannel puncturing when a single non-edge subchannel within a central portion of the EHT PPDU is punctured, the EHT STA may determine mask values for the overall spectral mask. In these embodiments, for each frequency where the non-preamble-puncture spectral mask has a value and the preamble-puncture spectral mask does not have a value in an occupied subchannel, the EHT STA may set the mask value for the overall spectral mask to the value of the non-preamble-puncture spectral mask. In these embodiments, for other frequencies where the non-preamble-puncture spectral mask and the preamble-puncture spectral mask both have values greater or equal to −23 dBr, the EHT STA may set the mask value for the overall spectral mask to a lower value of the non-preamble-puncture spectral mask and the preamble-puncture spectral mask.

In some embodiments, the EHT STA may encode the EHT PPDU to include a universal signal field (U-SIG) within the preamble portion. In these embodiments, a bandwidth of the spectral mask may be indicated (i.e., determined) by a bandwidth indicator in a bandwidth subfield of the U-SIG.

In these embodiments, the EHT STA may refrain from encoding data for transmission on the punctured subchannels. In these embodiments, the EHT STA may transmit the EHT PPDU after application of the spectral mask when preamble puncturing is not performed and after further application of the preamble-puncture spectral mask when preamble puncturing is performed.

Figure 2:
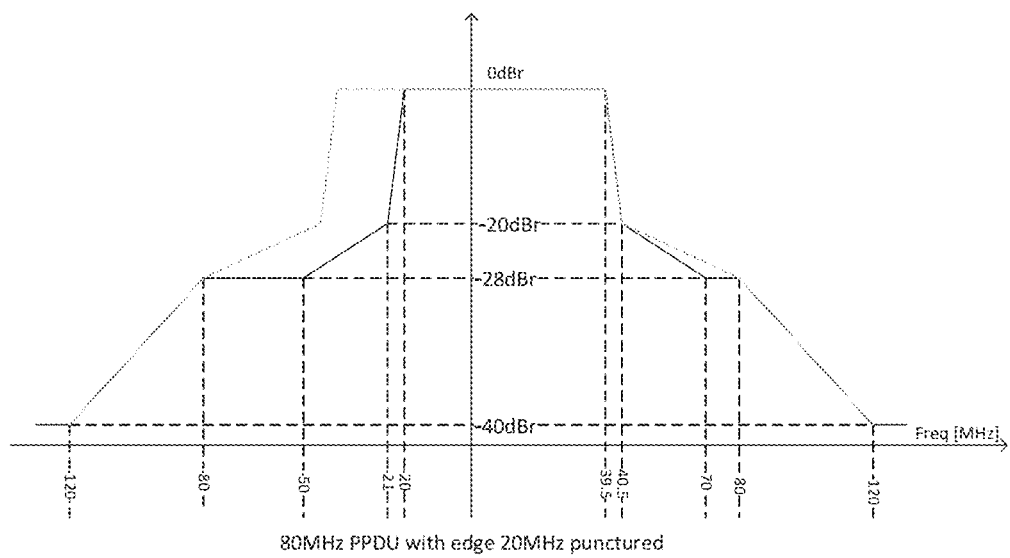
FIG. 2 illustrates a spectral mask for an 80 MHz PPDU with edge 20 MHz puncturing in accordance with some embodiments.

In some embodiments, the EHT PPDU may comprise an 80 MHz PPDU comprising four 20 MHz channels with 20 MHz edge subchannel puncturing in which the highest and lowest 20 MHz channels of the 80 MHz PPDU are punctured (see FIG. 2).

Figure 3:
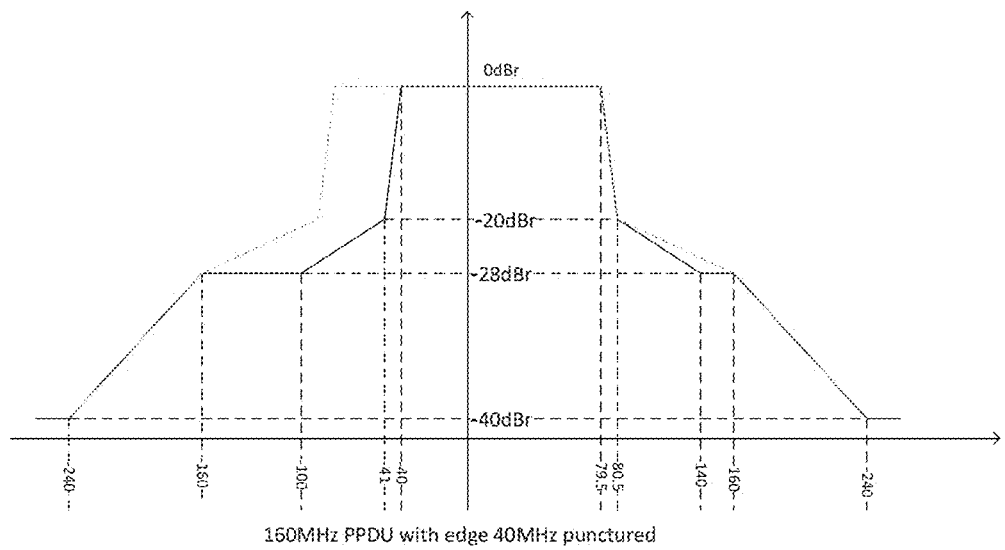
FIG. 3 illustrates a spectral mask for an 160 MHz PPDU with edge 40 MHz puncturing in accordance with some embodiments.
Figure 4:
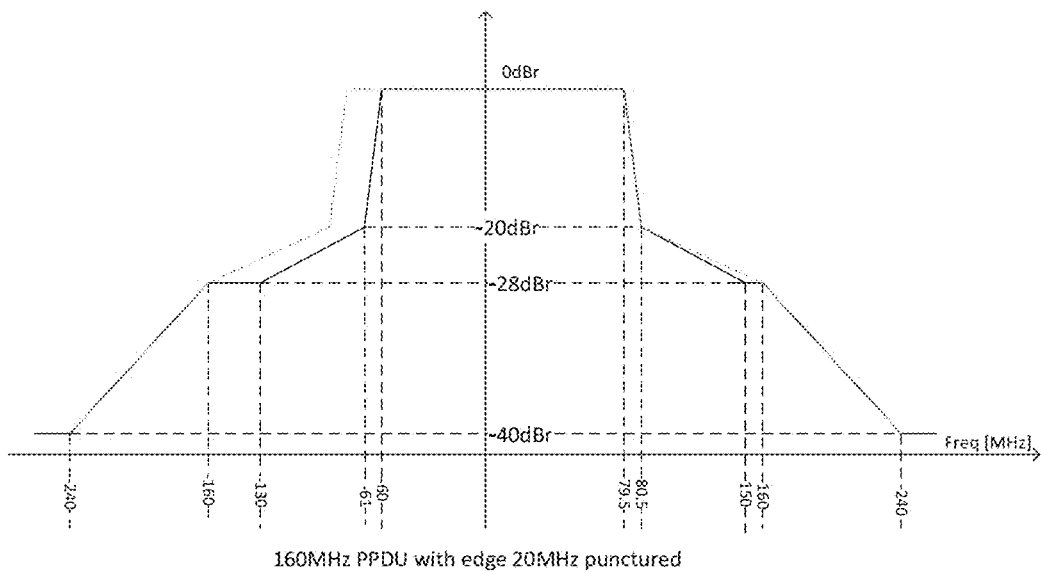
FIG. 4 illustrates a spectral mask for an 160 MHz PPDU with edge 20 MHz puncturing in accordance with some embodiments.

In some embodiments, the EHT PPDU may comprise an 160 MHz PPDU comprising eight 20 MHz channels with 40 MHz edge subchannel puncturing in which the highest and lowest two 20 MHz channels of the 160 MHz PPDU are punctured (see FIG. 3).

Figure 5:
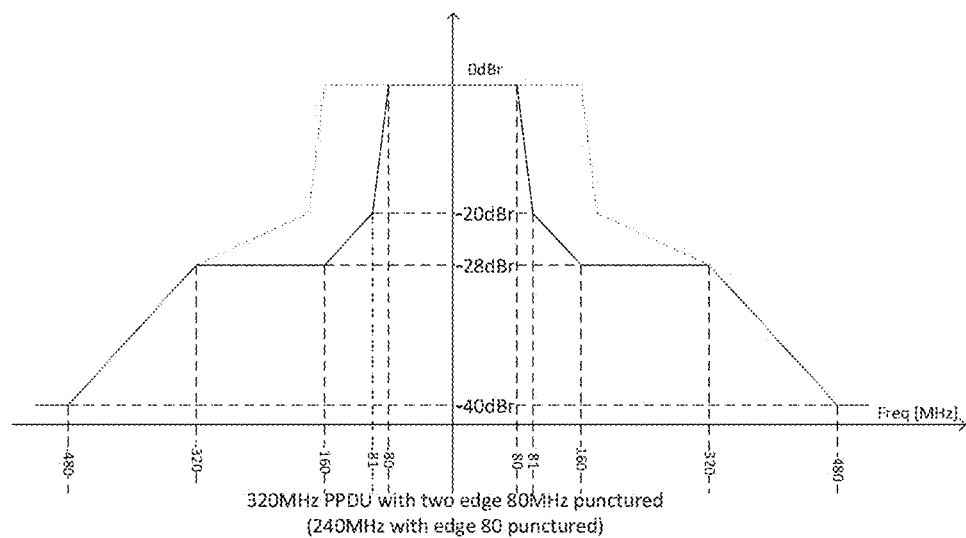
FIG. 5 illustrates a spectral mask for an 320 MHz PPDU with two-edge 80 MHz puncturing in accordance with some embodiments.

In some embodiments, the EHT PPDU may comprise an 320 MHz PPDU comprising sixteen 20 MHz channels with 80 MHz edge subchannel puncturing in which the highest and lowest four 20 MHz channels of the 320 MHz PPDU are punctured (see FIG. 5).

Figure 6:
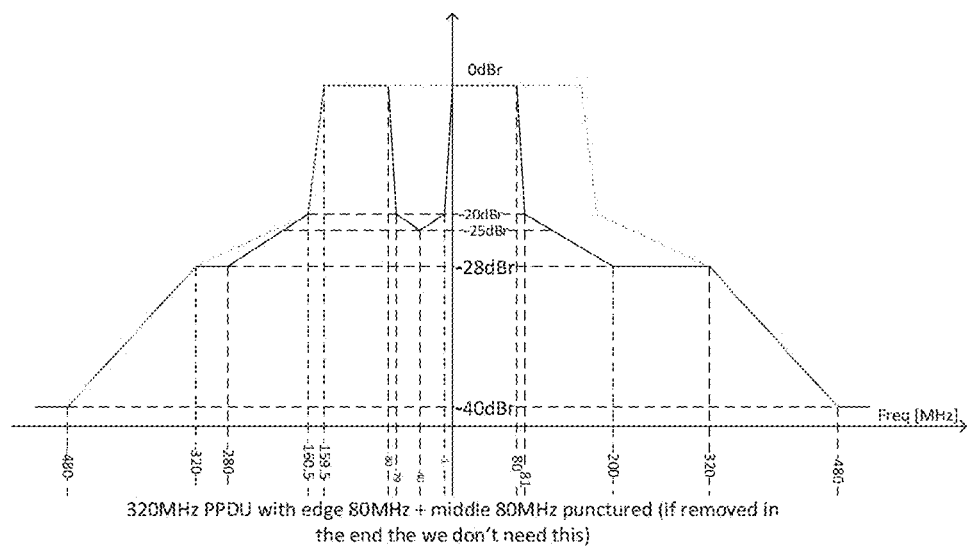
FIG. 6 illustrates a spectral mask for an 320 MHz PPDU with edge 80 MHz and middle 80 MHz puncturing in accordance with some embodiments.
Figure 7:
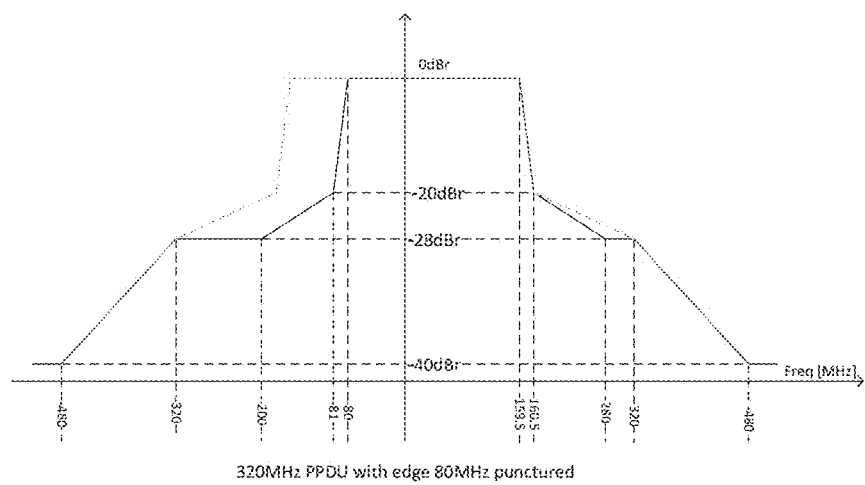
FIG. 7 illustrates a spectral mask for an 320 MHz PPDU with edge 80 MHz puncturing in accordance with some embodiments.
Figure 8:
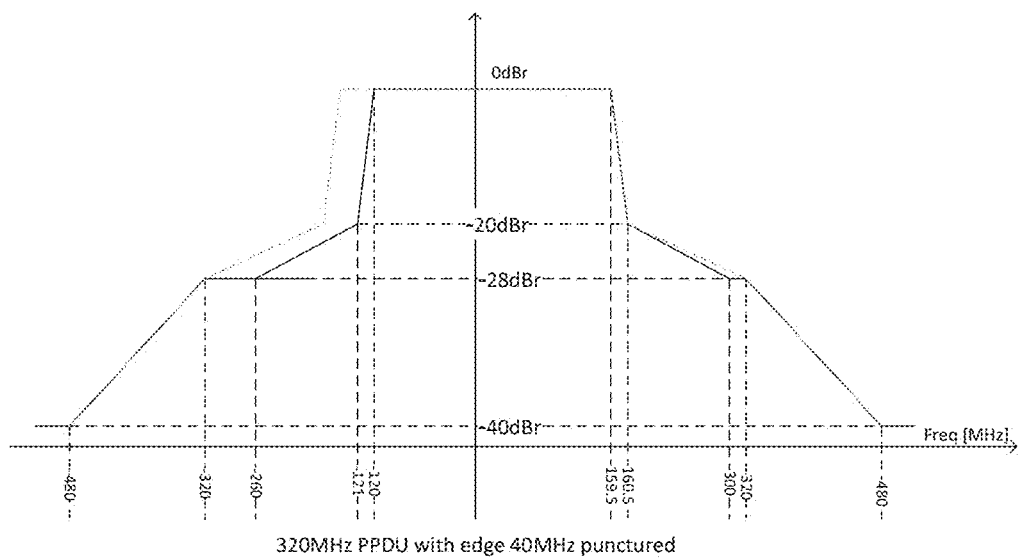
FIG. 8 illustrates a spectral mask for an 320 MHz PPDU with edge 40 MHz puncturing in accordance with some embodiments.
Figure 9:
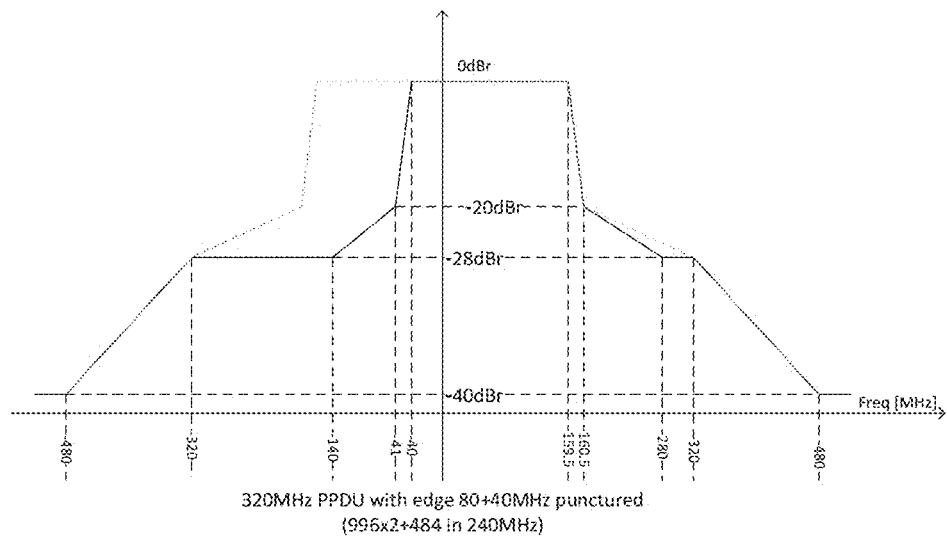
FIG. 9 illustrates a spectral mask for an 320 MHz PPDU with edge 80+40 MHz puncturing in accordance with some embodiments.
Figure 10:
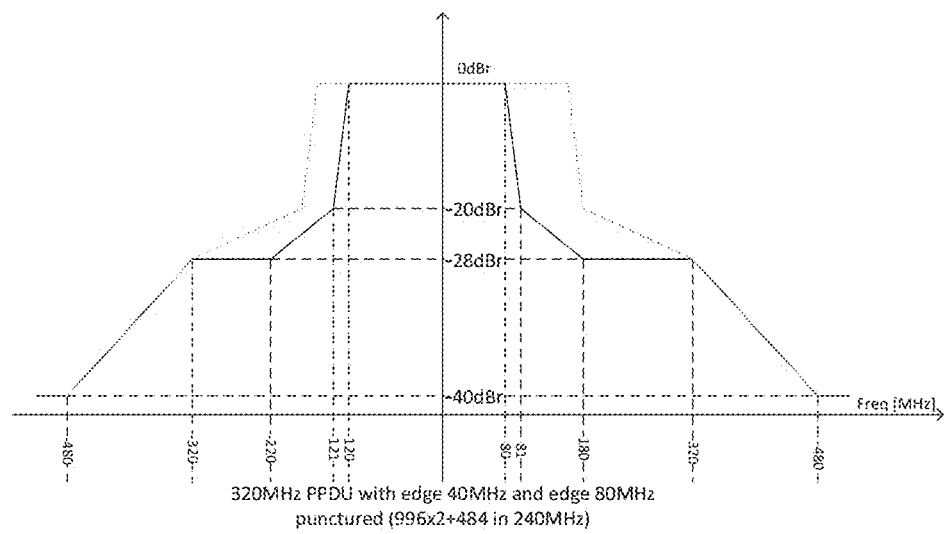
FIG. 10 illustrates a spectral mask for an 320 MHz PPDU with edge 40 MHz and edge 80 MHz puncturing in accordance with some embodiments.
Figure 11:
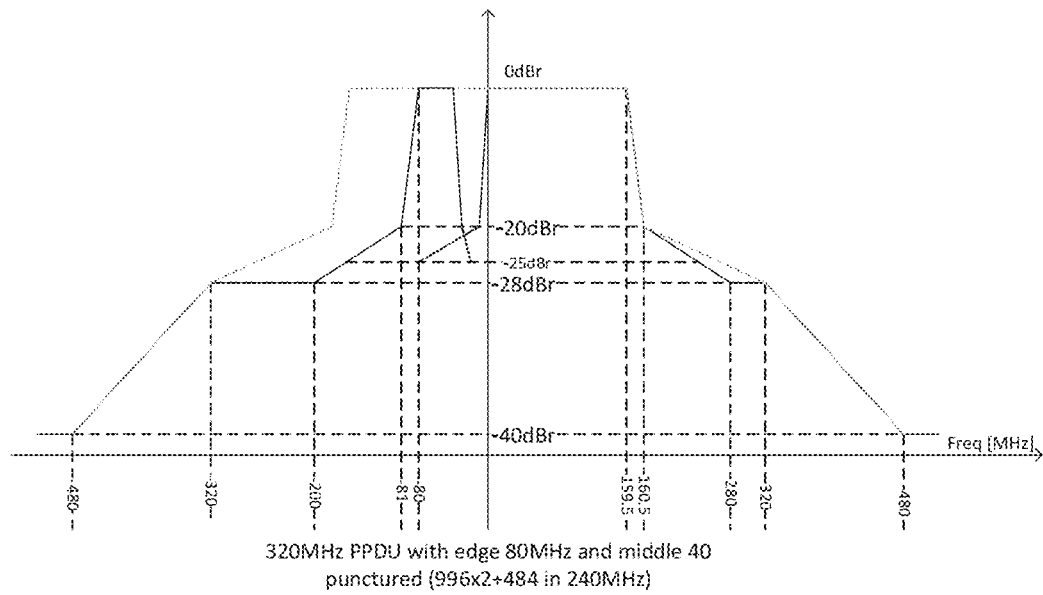
FIG. 11 illustrates a spectral mask for an 320 MHz PPDU with edge 80 MHz and middle 40 MHz puncturing in accordance with some embodiments.

In some embodiments, the EHT PPDU may comprise an 320 MHz PPDU comprising sixteen 20 MHz channels with 80 MHz middle subchannel puncturing in which the central four 20 MHz channels of the 320 MHz PPDU are punctured (see FIG. 6).

Figure 13:
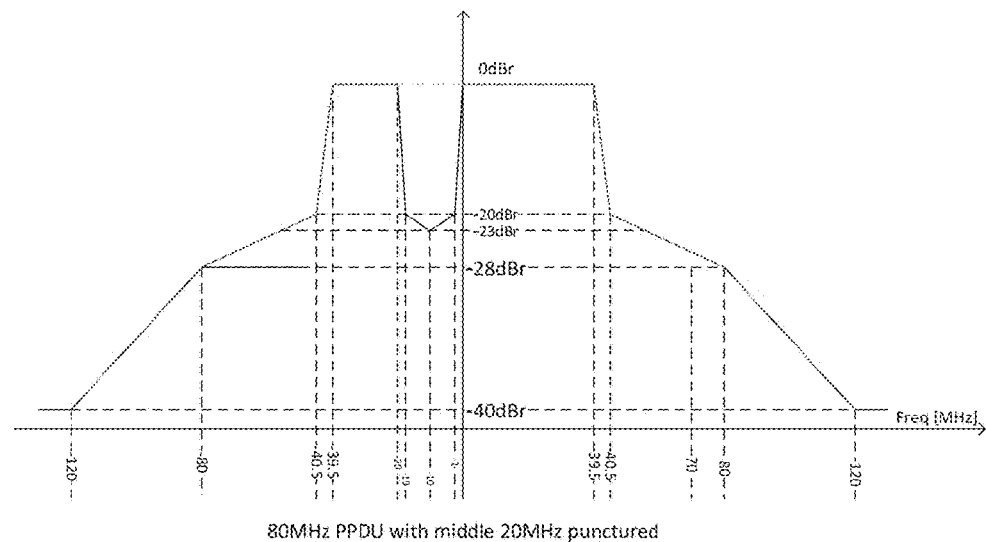
FIG. 13 illustrates a spectral mask for an 80 MHz PPDU with middle 20 MHz puncturing in accordance with some embodiments.

In some embodiments, the EHT PPDU may comprise an 80 MHz PPDU comprising four 20 MHz channels with 20 MHz middle subchannel puncturing in which one of the central 20 MHz channels of the 80 MHz PPDU are punctured (see FIG. 13).

Figure 14:
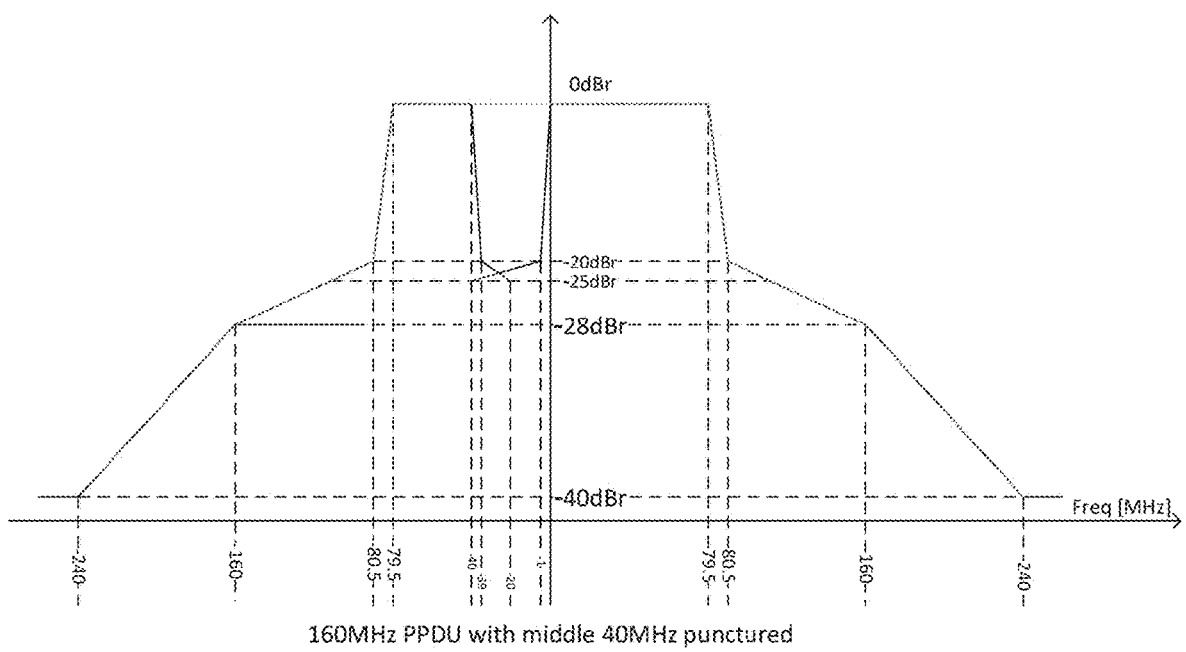
FIG. 14 illustrates a spectral mask for an 160 MHz PPDU with middle 40 MHz puncturing in accordance with some embodiments.
Figure 15:
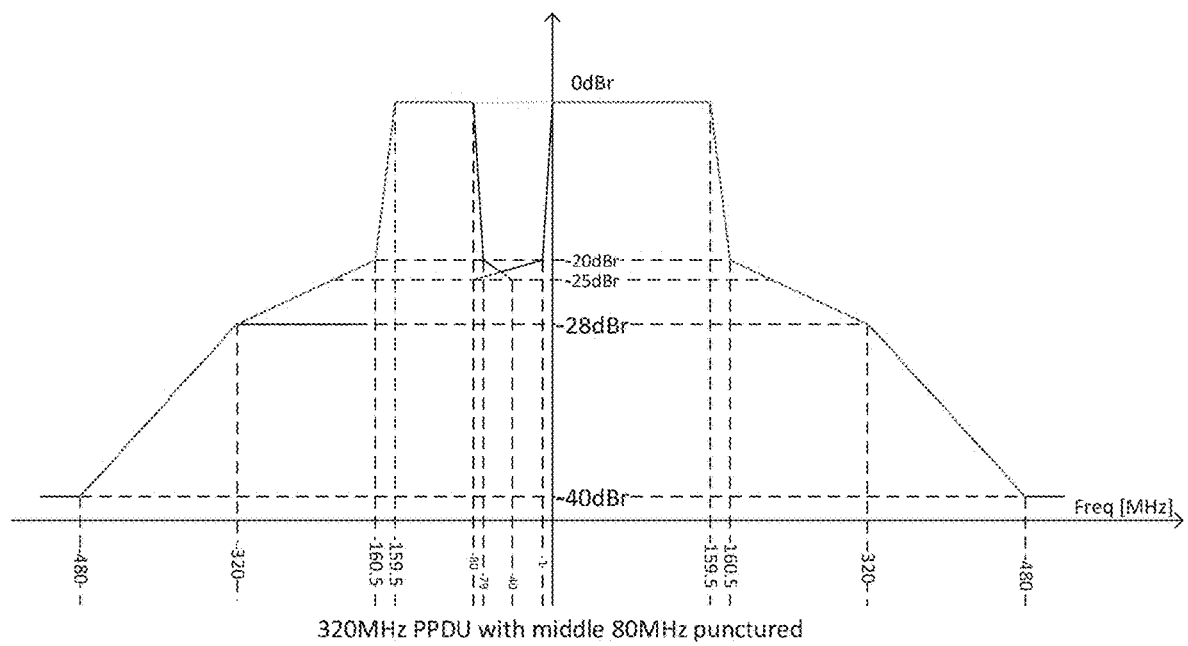
FIG. 15 illustrates a spectral mask for an 320 MHz PPDU with middle 80 MHz puncturing in accordance with some embodiments.
Figure 16:
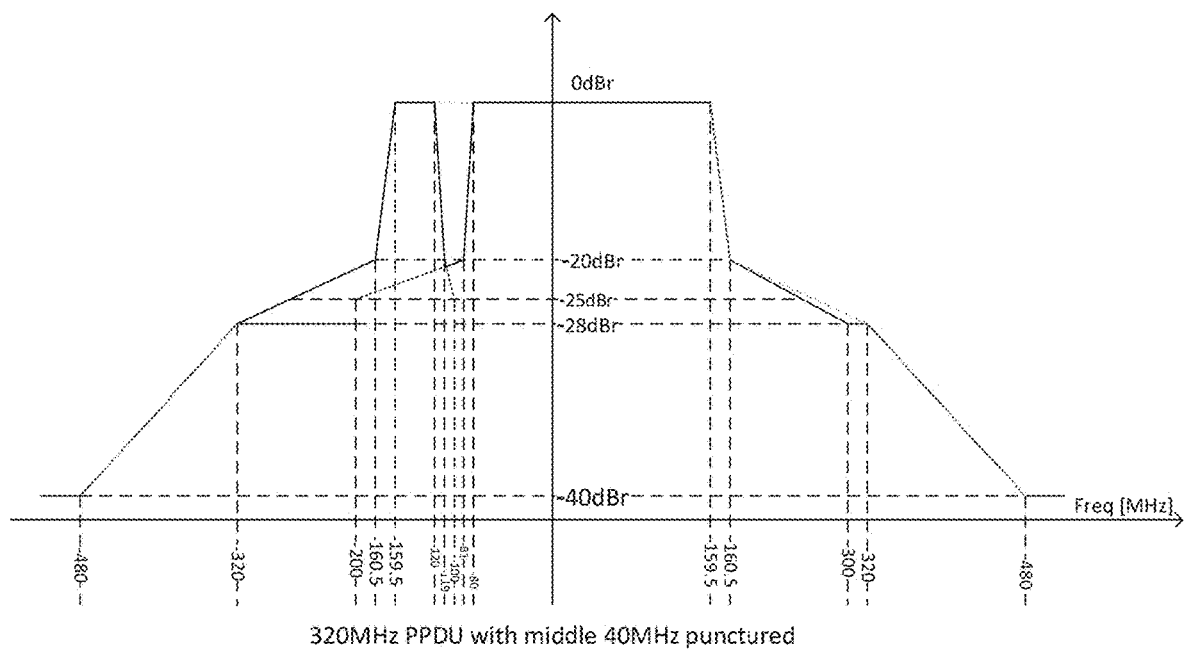
FIG. 16 illustrates a spectral mask for an 320 MHz PPDU with middle 40 MHz puncturing in accordance with some embodiments.

In some embodiments, the EHT PPDU may comprise an 160 MHz PPDU comprising four 20 MHz channels with 40 MHz middle subchannel puncturing in which one of the central two 20 MHz channels of the 160 MHz PPDU are punctured (see FIG. 14).

In some embodiments, the EHT STA may include processing circuitry which may include a baseband processor. In some embodiments, to implement the spectral mask and/or the overall spectral mask, the baseband processor may perform digital filter processing on baseband signals. In some embodiments, the processing circuitry may generate signalling to apply an analog filter at RF to further to implement the spectral mask and/or the overall spectral mask. In some embodiments, the memory may store the spectral mask and/or the overall spectral mask.

In some embodiments, the EHT STA may encode an EHT PPDU for transmission on a plurality of subchannels in a 6 GHz band. In these embodiments, the EHT STA may determine if preamble puncturing is to be performed for one or more of the channels based on a presence of incumbents in the one or more of the subchannels.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE draft specification IEEE P802.11ax/D4.0, February 2019 is incorporated herein by reference in its entirety.

Figure 20:
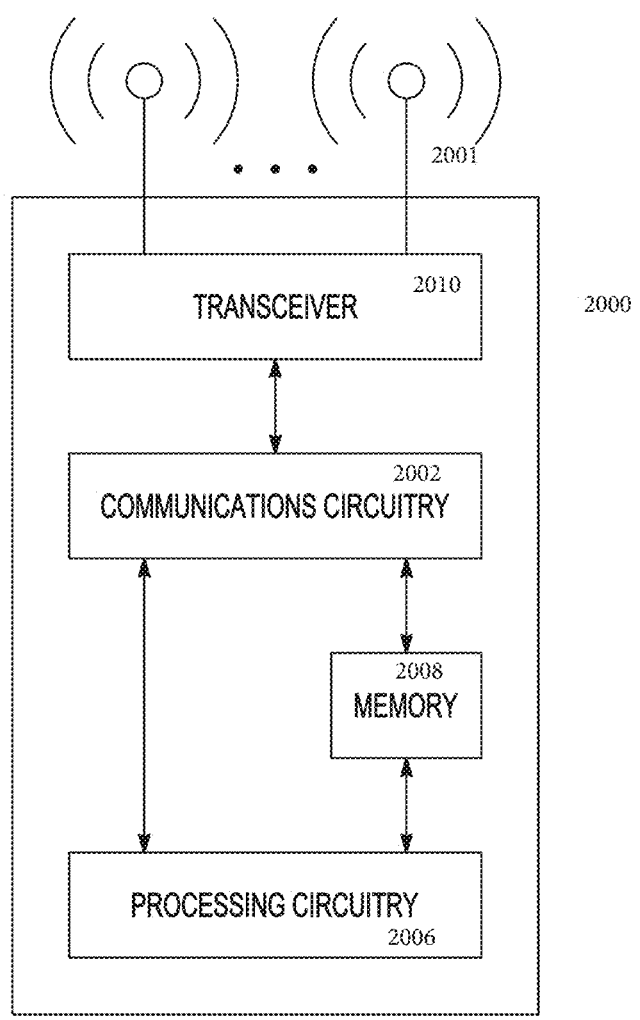
FIG. 20 illustrates a functional block diagram of a wireless communication station in accordance with some embodiments.

In one embodiment, FIG. 20 illustrates a functional block diagram of a communication station that may be suitable for use as an EHT AP STA or a EHT non-AP STA in accordance with some embodiments. The communication station 2000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 2000 may include communications circuitry 2002 and a transceiver 2010 for transmitting and receiving signals to and from other communication stations using one or more antennas 2001. The communications circuitry 2002 may include circuitry that can operate the physical layer (PHY) communications and/or medium access control (MAC) communications for controlling access to the wireless medium, and/or any other communications layers for transmitting and receiving signals. The communication station 2000 may also include processing circuitry 2006 and memory 2008 arranged to perform the operations described herein. In some embodiments, the communications circuitry 2002 and the processing circuitry 2006 may be configured to perform operations detailed in the above figures, diagrams, and flows.

In accordance with some embodiments, the communications circuitry 2002 may be arranged to contend for a wireless medium and configure frames or packets for communicating over the wireless medium. The communications circuitry 2002 may be arranged to transmit and receive signals. The communications circuitry 2002 may also include circuitry for modulation/demodulation, upconversion/downconversion, filtering, amplification, etc. In some embodiments, the processing circuitry 2006 of the communication station 2000 may include one or more processors. In other embodiments, two or more antennas 2001 may be coupled to the communications circuitry 2002 arranged for sending and receiving signals. The memory 2008 may store information for configuring the processing circuitry 2006 to perform operations for configuring and transmitting message frames and performing the various operations described herein. The memory 2008 may include any type of memory, including non-transitory memory, for storing information in a form readable by a machine (e.g., a computer). For example, the memory 2008 may include a computer-readable storage device, read-only memory (ROM), random-access memory (RAM), magnetic disk storage media, optical storage media, flash-memory devices and other storage devices and media.

In some embodiments, the communication station 2000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 2000 may include one or more antennas 2001. The antennas 2001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 2000 may include one or more of a keyboard, a display, a non-volatile memory port, multiple antennas, a graphics processor, an application processor, speakers, and other mobile device elements. The display may be an LCD screen including a touch screen.

Although the communication station 2000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 2000 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an extremely high-throughput (EHT) station (STA), the EHT station comprising: processing circuitry; and memory, wherein the processing circuitry is configured to:
encode an EHT physical layer protocol data unit may be a physical layer conformance procedure (PLCP) protocol data unit (PPDU) for transmission on a plurality of subchannels, the EHT PPDU comprising a preamble portion and a subsequent portion; and
determine a spectral mask to apply to the EHT PPDU prior to transmission of the EHT PPDU,
wherein when preamble puncturing is performed, the processing circuitry is configured to:
apply an overall spectral mask to the EHT PPDU prior to transmission by applying an interim spectral mask and further applying a preamble-puncture spectral mask to the EHT PPDU; and
configure the EHT PPDU for transmission on each of the subchannels of the plurality except for one or more punctured subchannels of the plurality,
wherein when the preamble puncturing is not performed, the processing circuitry is configured to:
configure the EHT PPDU for transmission on each of the subchannels of the plurality by only applying the interim spectral mask to the EHT PPDU,
wherein the preamble-puncture spectral mask is determined based on whether the one or more punctured subchannels comprise edge subchannels or comprise middle subchannels of the EHT PPDU.

2. The apparatus of claim 1, wherein the one or more subchannels comprise subchannels in a 6 GHz band, and wherein preamble puncturing is performed on the punctured subchannels based on a presence of incumbents.

3. The apparatus of claim 1, wherein when the one or more punctured subchannels comprise an edge subchannel, the processing circuitry is configured to:
determine a mask value for the overall spectral mask,
wherein for each frequency where a non-preamble-puncture spectral mask has a value of zero decibels relative to a reference level (dBr) and the preamble-puncture spectral mask does not have a value in an occupied one of the subchannels, the processing circuitry is to set the mask value for the overall spectral mask to zero dBr, and
wherein for other frequencies where the non-preamble-puncture spectral mask and the preamble-puncture spectral mask both have values greater or equal to −40 dBr, the processing circuitry is to set the mask value for the overall spectral mask to a lower value of the non-preamble-puncture spectral mask and the preamble-puncture spectral mask; and
apply the overall spectral mask at an edge of an occupied one of the subchannels, the edge of the occupied subchannel being adjacent to one of the punctured subchannels.

4. The apparatus of claim 1, wherein when two or more adjacent subchannels within a central portion of the EHT PPDU are punctured, the two or more adjacent subchannels comprising a lowest punctured subchannel and a highest punctured subchannel,
the processing circuitry is configured to:
apply a lower subchannel edge mask at a lower edge at the lowest punctured subchannel and apply a higher subchannel edge mask at a higher edge of the highest punctured subchannel;
determine mask values for the overall spectral mask,
wherein for each frequency where the lower subchannel edge mask and the higher subchannel edge mask have a value greater than −25 dBr and less that −20 dBr, the processing circuitry is to set the mask value for the overall spectral mask to a larger value of the lower subchannel edge mask and the higher subchannel edge mask, and
wherein for each frequency where a non-preamble-puncture spectral mask has a value and the preamble-puncture spectral mask does not have a value in an occupied subchannel, the processing circuitry is to set the mask value for the overall spectral mask to the value of the non-preamble-puncture spectral mask, and
wherein for other frequencies where the non-preamble-puncture spectral mask and the preamble-puncture spectral mask both have values greater or equal to −25 dBr, the processing circuitry is to set the mask value for the overall spectral mask to a lower value of the non-preamble-puncture spectral mask and the preamble-puncture spectral mask.

5. The apparatus of claim 1, wherein when a single subchannel within a central portion of the EHT PPDU is punctured,
the processing circuitry is configured to:
determine mask values for the overall spectral mask,
wherein for each frequency where the non-preamble-puncture spectral mask has a value and the preamble-puncture spectral mask does not have a value in an occupied subchannel, the processing circuitry is to set the mask value for the overall spectral mask to the value of the non-preamble-puncture spectral mask, and
wherein for other frequencies where a non-preamble-puncture spectral mask and the preamble-puncture spectral mask both have values greater or equal to −23 dBr, the processing circuitry is to set the mask value for the overall spectral mask to a lower value of the non-preamble-puncture spectral mask and the preamble-puncture spectral mask.

6. The apparatus of claim 1, wherein the processing circuitry is to encode the EHT PPDU to include a universal signal field (U-SIG) within the preamble portion, wherein a bandwidth of the spectral mask is indicated by a bandwidth indicator in a bandwidth subfield of the U-SIG,
wherein the processing circuitry is configured to refrain from encoding data for transmission on the punctured subchannels, and
wherein the processing circuitry is to configure the EHT STA to transmit the EHT PPDU after application of the spectral mask, and after further application of the preamble-puncture spectral mask when preamble puncturing is performed.

7. The apparatus of claim 3, wherein the EHT PPDU comprises an 80 MHz PPDU comprising four 20 MHz channels with 20 MHz edge subchannel puncturing in which a highest and lowest 20 MHz channels of the 80 MHz PPDU are punctured.

8. The apparatus of claim 3, wherein the EHT PPDU comprises an 160 MHz PPDU comprising eight 20 MHz channels with 40 MHz edge subchannel puncturing in which a highest and lowest two 20 MHz channels of the 160 MHz PPDU are punctured.

9. The apparatus of claim 3, wherein the EHT PPDU comprises an 320 MHz PPDU comprising sixteen 20 MHz channels with 80 MHz edge subchannel puncturing in which a highest and lowest four 20 MHz channels of the 320 MHz PPDU are punctured.

10. The apparatus of claim 4, wherein the EHT PPDU comprises an 320 MHz PPDU comprising sixteen 20 MHz channels with 80 MHz middle subchannel puncturing in which a central four 20 MHz channels of the 320 MHz PPDU are punctured.

11. The apparatus of claim 5, wherein the EHT PPDU comprises an 80 MHz PPDU comprising four 20 MHz channels with 20 MHz middle subchannel puncturing in which one of a central 20 MHz channels of the 80 MHz PPDU are punctured.

12. The apparatus of claim 5, wherein the EHT PPDU comprises an 160 MHz PPDU comprising four 20 MHz channels with 40 MHz middle subchannel puncturing in which one of a central two 20 MHz channels of the 160 MHz PPDU are punctured.

13. A non-transitory computer-readable storage medium that stores instructions for execution by processing circuitry of an extremely high-throughput (EHT) station (STA) to configure the EHT STA to:
 encode an EHT physical layer protocol data unit may be a physical layer conformance procedure (PLCP) protocol data unit (PPDU) for transmission on a plurality of subchannels, the EHT PPDU comprising a preamble portion and a subsequent portion; and
 determine a spectral mask to apply to the EHT PPDU prior to transmission of the EHT PPDU,
 wherein when preamble puncturing is performed, the processing circuitry is configured to:
  apply an overall spectral mask to the EHT PPDU prior to transmission by applying an interim spectral mask and further applying a preamble-puncture spectral mask to the EHT PPDU; and
  configure the EHT PPDU for transmission on each of the subchannels of the plurality except for one or more punctured subchannels of the plurality,
 wherein when the preamble puncturing is not performed, the processing circuitry is configured to:
  configure the EHT PPDU for transmission on each of the subchannels of the plurality by only applying the interim spectral mask to the EHT PPDU,
 wherein the preamble-puncture spectral mask is determined based on whether the one or more punctured subchannels comprise edge subchannels or comprise middle subchannels of the EHT PPDU.

14. The non-transitory computer-readable storage medium of claim 13, wherein the one or more subchannels comprise subchannels in a 6 GHz band, and wherein preamble puncturing is performed on the punctured subchannels based on a presence of incumbents.

15. An apparatus of an extremely high-throughput (EHT) station (STA), the EHT station comprising: processing circuitry; and memory, wherein the processing circuitry is configured to:
 encode an EHT physical layer protocol data unit may be a physical layer conformance procedure (PLCP) protocol data unit (PPDU) for transmission on a plurality of subchannels in a 6 GHz band, the EHT PPDU comprising a preamble portion and a subsequent portion; and
 determine a spectral mask to apply to the EHT PPDU prior to transmission of the EHT PPDU;
 determine if preamble puncturing is to be performed for one or more of the subchannels based on a presence of incumbents in the one or more of the subchannels; and
 wherein when preamble puncturing is performed, the processing circuitry is configured to:
  apply an overall spectral mask to the EHT PPDU prior to transmission by applying an interim spectral mask and further applying a preamble-puncture spectral mask to the EHT PPDU; and
  configure the EHT PPDU for transmission on each of the subchannels of the plurality except for one or more punctured subchannels of the plurality,
 wherein when the preamble puncturing is not performed, the processing circuitry is configured to:
  configure the EHT PPDU for transmission on each of the subchannels of the plurality by only applying the interim spectral mask to the EHT PPDU,
 wherein the preamble-puncture spectral mask is determined based on whether the one or more punctured subchannels comprise edge subchannels or comprise middle subchannels of the EHT PPDU.

* * * * *